(12) United States Patent  
Sørensen

(10) Patent No.: US 11,462,914 B2  
(45) Date of Patent: Oct. 4, 2022

(54) METHOD FOR BLACK-STARTING AN ELECTRICAL GRID

(71) Applicant: Ørsted Wind Power A/S, Fredericia (DK)

(72) Inventor: Troels Stybe Sørensen, Gentofte (DK)

(73) Assignee: Ørsted Wind Power A/S

( * ) Notice: Subject to any disclaimer, the term of this patent is extended or adjusted under 35 U.S.C. 154(b) by 137 days.

(21) Appl. No.: 16/753,311

(22) PCT Filed: Nov. 16, 2018

(86) PCT No.: PCT/EP2018/081568  
§ 371 (c)(1),  
(2) Date: Apr. 2, 2020

(87) PCT Pub. No.: WO2019/073088  
PCT Pub. Date: Apr. 18, 2019

(65) Prior Publication Data  
US 2020/0244070 A1   Jul. 30, 2020

(30) Foreign Application Priority Data

Oct. 13, 2017 (EP) ..................................... 17196341

(51) Int. Cl.  
*H02J 3/38* (2006.01)  
*F03D 9/25* (2016.01)  
(Continued)

(52) U.S. Cl.  
CPC .............. *H02J 3/381* (2013.01); *F03D 7/026* (2013.01); *F03D 7/048* (2013.01); *F03D 9/257* (2017.02);  
(Continued)

(58) Field of Classification Search  
CPC .. H02J 3/381; H02J 3/001; H02J 3/388; H02J 3/1842; H02J 3/32; H02J 2300/28; F03D 9/257; F03D 7/026; F03D 7/048  
See application file for complete search history.

(56) References Cited

U.S. PATENT DOCUMENTS 8,000,840 B2   8/2011   Nielsen  
8,436,490 B2 *   5/2013   Gertmar .................. H02J 3/386  
307/100

(Continued)

FOREIGN PATENT DOCUMENTS

CN   104836248 A   8/2015  
EP   1 909 371 A2   4/2008  
(Continued)

*Primary Examiner* — Carlos Amaya  
(74) *Attorney, Agent, or Firm* — Condo Roccia Koptiw LLP

(57) ABSTRACT

Methods for black-starting an electrical grid (2) are described herein. For example, a method comprising disconnecting the wind farm (1) from the grid at a first location, said first location being located between the electrical grid (2) and the energy storage (16) with the associated converter (17), energizing the AC export cable (12) using said energy storage (16) and the associated converter (17), energizing at least one part of the wind farm electrical infrastructure via said export cable (12) using said energy storage (16) and the associated converter (17), re-establishing energy supply to said wind farm electrical infrastructure by said wind turbine generators (3, 4), and reconnecting the wind farm (1) to said electrical grid (2) at said first location.

21 Claims, 1 Drawing Sheet

(51) Int. Cl.
  *H02J 3/00* (2006.01)
  *F03D 7/02* (2006.01)
  *F03D 7/04* (2006.01)
  *H02J 3/18* (2006.01)
  *H02J 3/32* (2006.01)

(52) U.S. Cl.
  CPC ............ *H02J 3/001* (2020.01); *H02J 3/1842* (2013.01); *H02J 3/32* (2013.01); *H02J 3/388* (2020.01); *H02J 2300/28* (2020.01)

(56) References Cited

U.S. PATENT DOCUMENTS

| | | | |
|---|---|---|---|
| 11,070,057 B2 * | 7/2021 | Brombach | ................ H02J 3/46 |
| 2012/0261917 A1 | 10/2012 | Egedal et al. | |
| 2015/0130187 A1 * | 5/2015 | Yin | ........................ F03D 7/048 |
| | | | 290/44 |
| 2017/0214250 A1 | 7/2017 | Zietlow et al. | |

FOREIGN PATENT DOCUMENTS

| | | |
|---|---|---|
| EP | 2 573 896 A1 | 3/2013 |
| EP | 3 051 124 A1 | 8/2016 |
| WO | WO 2011/058170 A1 | 5/2011 |
| WO | WO 2015/078471 A1 | 6/2015 |
| WO | WO 2017/004125 A1 | 1/2017 |

\* cited by examiner

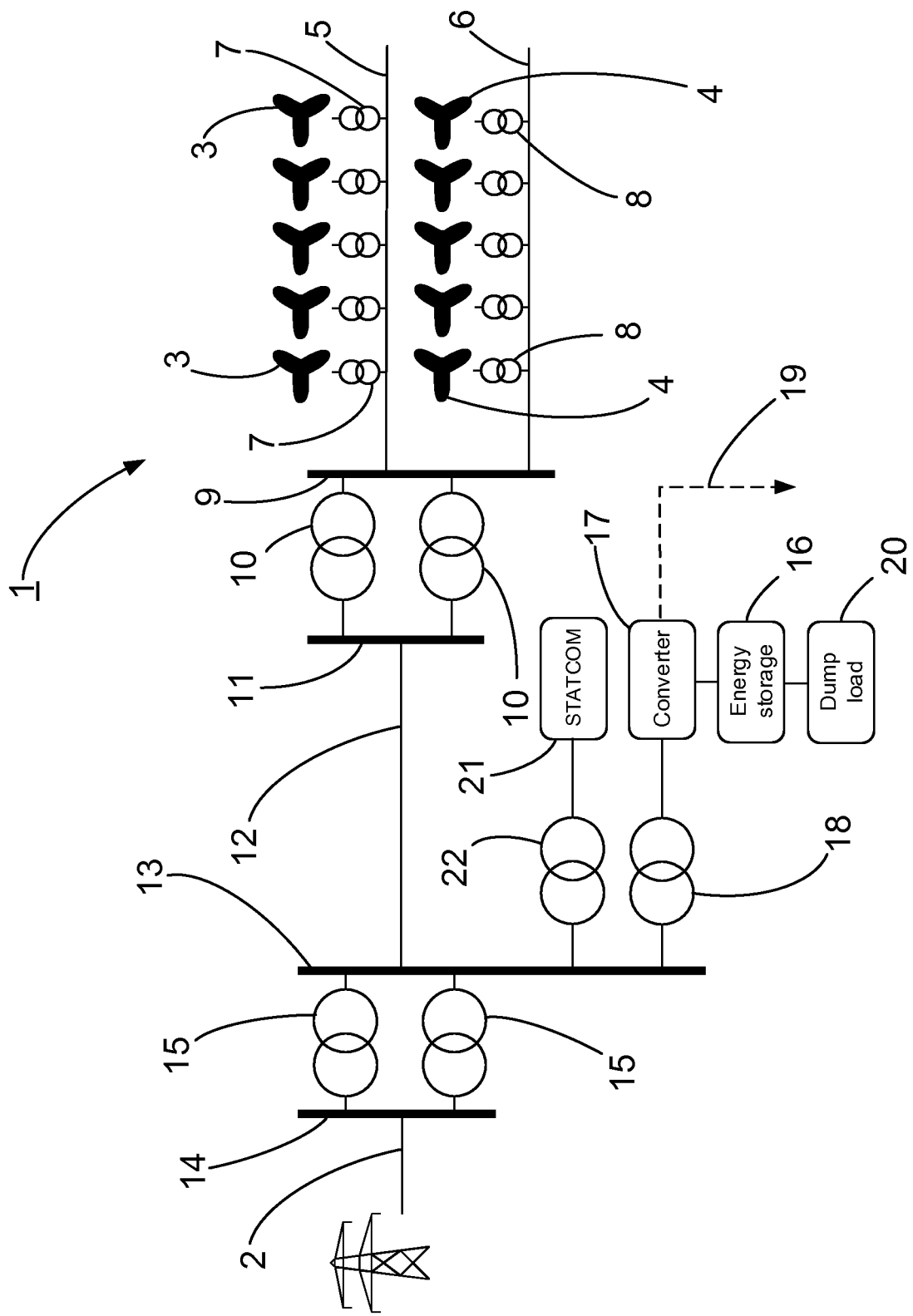

METHOD FOR BLACK-STARTING AN ELECTRICAL GRID

CROSS-REFERENCE TO RELATED APPLICATIONS

This application is the National Stage Entry under 35 U.S.C. § 371 of Patent Cooperation Treaty Application No. PCT/EP2018/081568, filed 16 Nov. 2018, which claims priority from European Application No. 17196341.6, filed 13 Oct. 2017, the contents of which are hereby incorporated by reference herein.

FIELD

The present invention relates to wind farms, in particular a method and use of a wind farm for black-starting an electrical grid.

BACKGROUND

In the field of electricity generation and transmission, black-start is a service provided to the operator of an electrical grid, such as a transmission system operator, TSO, or a distribution system operator, DSO, when an electrical grid, i.e. a power transmission or distribution system needs to be reenergized after a blackout, i.e. a total loss of power in the grid. The capability of reenergizing the grid system without the support of the grid itself, is known as black-start service. This is a service the grid operator pays selected electricity generators for maintaining and providing.

In the event of a blackout of the grid the grid connections to the consumers as well as to electricity generators such as power plants are opened and the grid is separated into smaller sub-systems which are no longer energized. The restart process of the system then takes place by a step-by-step process where power plants are powered up in island mode, i.e. without connection to the grid and then used to connect to and re-energize separate parts of the grid. Subsequently the separate parts of the grid are synchronized and interconnected again. Transmission system operators and distribution system operators have detailed procedures for re-establishing grid operation, but depending on how widespread the blackout is the re-establishment process can take several hours. Power plants able to connect to a dead, i.e. de-energized, grid and re-energize it are called black-start power plants, and, as mentioned, transmission system operators and distribution system operators contract power plant owners to provide black-start services. Since, in case of a blackout, large numbers of consumers, including critical infrastructure are without power it is of outmost importance to get the grid and the supply thereto re-established as quickly as possible. Keeping the start-up time for the black-start power plant as low as possible is therefore important. Not all power plants however have the capability of black-starting, e.g. wind turbines, wind farms, and photo-voltaic plants would normally not. For instance, asynchronous generators as often used in wind turbines are highly dependent on an external stable power supply for their magnetizing and will lose synchronicity and experience runaway if not stopped when the connection to the external power system is lost, i.e. to the grid. Even double-fed asynchronous generators will only be able to ride-through a loss of the grid for short periods in the range of 0.1 to 3 seconds before experiencing runaway if not stopped, upon which a cumbersome restart procedure needs to be performed after the grid is re-energized. Other systems like wind turbines with permanent magnet generators, rely on AC/DC and DC/AC conversion, where the latter also needs power from the external power system to be able to power up AC/DC and DC/AC converters before start producing power with the wind turbine. Likewise do the DC/AC converters of photo-voltaic plants.

Fault ride-through, low voltage ride-through, and high voltage ride through, are phrases commonly used to describe short duration abnormal voltage events in power systems, where ride-through means that systems and components, such as wind turbines and wind farms, remain connected. Evidently such generators are not well suited for black-start.

Traditionally, black-start services have therefore been provided by central thermal power plants with synchronous generators, but with the phasing out of thermal power plants transmission system operators and distribution system operators are facing an increasing need for new providers of black-start services. It is therefore of interest if renewable energy sources such as wind turbines, in particular in wind farms, generating electricity may be used for black-start of the electricity grid, i.e. the aforementioned transmission and distribution systems. Furthermore, there is a tendency towards larger wind farms being offshore, and it would be of particular interest to use these for black-start services.

In this respect, various methods of using wind turbines and wind farms for black-start have already been suggested. Examples inter alia are found in the disclosures of U.S. Pat. No. 8,000,840, EP1909371, CN104836248 and US2012/0261917. Common to the methods of these disclosures is that they approach the black-start problem in much the same way as traditional black-start from central thermal power plants with synchronous generators. That is to say start a small generator, such as a diesel engine driven generator or a gas fired turbine driving a generator. The small diesel generator in turn providing power to start a larger generator, e.g. a gas fired turbine driven generator, and possibly a larger steam driven turbo-generator in island mode, and then eventually when a stable island mode is reached reconnect to the grid to power it up and, i.e. black-starting it, and then in turn, allow other generating plants which need the grid to start and reconnect. Likewise, in the above mentioned disclosures, a source close to a single wind turbine generator is used to start up that one wind turbine, and only when that single wind turbine generator is stable can other wind turbine generators connected to the same array cable line or bus bar be started. It therefore takes quite a while before the entire wind farm is up and running sufficiently stable in island mode, so that it can be used for black-starting the electricity grid.

SUMMARY

Based on this outset the object of the present invention is to simplify the start-up process of the wind turbines and to reduce this start-up time and thus make it more feasible and attractive to use a wind farm for black-start services.

Faced with this problem, the inventor of the present invention has realized that it is possible to reduce the time required for black-start of a wind farm and the complexity of the operation by applying a completely new approach to the black-start of the wind farm, and hence a new and faster method for such a black-start, in particular for large wind farms and offshore wind farms.

According to a first aspect of the present invention this object is achieved by a method for black-starting an electrical grid, said method comprising providing an electrical grid, providing a wind farm having an electrical infrastructure and a first number of wind turbine generators, providing an AC export cable for connecting said wind farm to said electrical grid, providing an energy storage with an associated converter, disconnecting the wind farm from the grid at a first location, said first location being located between the electrical grid and the energy storage with the associated converter, energizing the AC export cable using said energy storage and the associated converter, energizing at least one part of the wind farm electrical infrastructure via said export cable using said energy storage and the associated converter, re-establishing energy supply to said wind farm electrical infrastructure by said wind turbine generators, reconnecting the wind farm to said electrical grid at said first location.

Provided that the energy source is sufficiently large to provide the necessary energy to do so, energizing the wind farm electrical infrastructure in island mode via the AC export cable allows a much faster black-start as compared to the above traditional approaches, because large numbers of wind turbine generators may be supplied at the same time and thus be released for starting in groups or simultaneously. However, providing this large storage on-shore, i.e. on land, for an offshore wind farm is not a problem—at least not as compared to providing it offshore, and converter circuity such as STATCOMs are already often used at the interface between AC export cable and the electrical grid in order to comply with requirements regarding reactive power supply set by the grid code.

Thus according to a preferred embodiment of the first aspect of the present invention, the wind farm is offshore and the energy storage with the associated converter is on-shore.

According to a further preferred embodiment of the first aspect of the invention, the wind farm electrical infrastructure comprises two or more groups of wind turbine generators connectable to a corresponding number of array cable lines connectable to a bus bar system wherein the at least one part of the wind farm electrical infrastructure energized via said export cable using said energy storage and the associated converter comprises one of said number of array cable lines.

If only a single array cable line is to be energized and not the entire wind farm, then this requires less energy storage and may still be sufficient to establish a stable island mode capable of restarting the electrical grid and/or the remainder of the wind farm. In either case this will be faster than the above disclosed traditional approach.

According to another preferred embodiment of the second aspect of the invention, the converter comprises a STATCOM. The STATCOM may be an integrated part of the converter to provide the converter STATCOM capabilities or separate therefrom. The STATCOM can be used for maintaining voltage stability and reactive power balance when energizing the AC line and the high voltage components associated with it as well as for maintaining voltage stability and reactive power balance when reconnecting the islanded black-start wind farm to the electrical grid.

According to a further preferred embodiment of the first aspect of the invention, the energy storage with the associated converter provides power to the electrical grid after reconnecting the wind farm to said electrical grid at said first location. In this way any remaining capacity of the energy storage can be used to support the re-energizing of the electrical grid and the stability thereof during this.

According to a further preferred embodiment according to the first aspect of the invention, the method further comprises providing one or more dump loads and control systems for controlling the dump loads, and using the control systems to control energy dissipation in the dump loads to help balancing the disconnected wind farm, i.e. help keeping the islanded system stable. Using controlled dump loads connected to the disconnected, i.e. islanded, wind farm may contribute to balancing the islanded wind farm, in particular once the wind turbines are reconnected to the islanded wind farm.

According to yet a further preferred embodiment of the present invention, synchronisation information is sent to further converters. This allows other similar wind farms to black-start in synchronicity, in turn, allowing the entire electrical grid to be re-unified faster as segmented parts re-energized by different black-start wind farms will need less or no time to synchronise before they are reconnected with each other.

According to a second aspect of the invention the object is achieved by the use of an energy storage with an associated converter for a black-start method according to the above method.

According to a third aspect of the invention the object is achieved by the use of a method for re-energizing an electrical grid, said method comprising providing a wind farm having an electrical infrastructure and a first number of wind turbine generators, providing an AC export cable for connecting said wind farm to said electrical grid, providing an energy storage with an associated converter, disconnecting the wind farm from the grid at a first location, said first location being located between the electrical grid and the energy storage with the associated converter, maintaining energizing of the AC export cable using said energy storage and the associated converter, and energizing at least one part of the wind farm electrical infrastructure via said export cable using said energy storage and the associated converter, reconnecting the wind farm to said electrical grid at said first location.

Hereby the energy storage is used as an uninterruptable power storage to support the disconnected wind farm in island mode, thereby allowing the wind turbines to ride-through until island mode is established and the wind farm enters a stable island mode in which the wind farm can remain for an extended period until either the grid is re-energized and the wind farm can reconnect in a controlled manner, or from which island mode the wind farm can be used for reenergizing the grid as described herein.

Thus, according to a preferred embodiment of the third aspect of the invention, when the least one part of the wind farm electrical infrastructure is maintained energized via said export cable said at one part of the wind farm is maintained in island mode for a period of time before reconnecting the wind farm to said electrical grid at said first location.

According to a fourth aspect of the invention the object of the invention is achieved by providing a wind farm adapted to carry out the method recited above.

BRIEF DESCRIPTION OF THE DRAWING

The invention will now be described in greater detail based on non-limiting exemplary embodiments and with reference to the drawing on which:

FIG. 1 schematically and simplified shows a system incorporating electrical grid with a wind farm capable of performing the method according to the invention.

DETAILED DESCRIPTION

In the following description it will be assumed that the wind turbine generators are offshore. Much of the layout or topology of the system of FIG. 1 is quite conventional and will only briefly be described, as the essence of the present invention resides in the completely new approach to black-start and island mode operation of the wind farm. The topology may be much more complex than shown in FIG. 1, but has been simplified for explanatory reasons. A similar topology is disclosed in the prior art document EP2573896.

The wind farm 1 which under normal circumstances is connected to the electrical grid 2 comprises a number of wind turbines 3 and 4.

The term electrical grid 2 in the present application is to be understood as comprising both power distribution systems and power transmission systems. Power transmission systems are often defined as systems operated at voltages higher than 100 kV, while systems operated at lower voltages such as 66 kV, which are often named "power distribution systems". Companies operating these systems are often referred to as Transmission System Operators and Distribution System Operators, respectively. Accordingly, the wind farm 1 connects either to a transmission system or to a distribution system. Hence black-start services can either be provided directly to the transmission system or to/via a distribution system.

Groups of wind turbine generators 3, 4 are connected to a common array cable line 5, 6, respectively, via a number of transformers 7, 8 transforming the normally low voltage generator output to a medium voltage (MV) used on the offshore MV bus bar 9. Typically, the low voltage (LV) is 400-990 V and the medium voltage is typically about 33-35 kV or about 66 kV. It should be noted that some wind turbine generators operate at medium voltage and in that case the transformers 7, 8 may not be needed. Currently, however, typical wind turbine generators are asynchronous generators or permanent magnet synchronous generators, the output coupled via an AC/DC/AC converter. A suitable number of transformers 10 are connected between the offshore MV bus bar system 9 and an offshore high voltage bus bar system 11 to which the AC export cable 12 is connected. Typically, the high voltage (HV) used for the AC export cable is 220 kV. On-shore the AC export cable is connected to an on-shore HV bus bar system 13. The on-shore HV bus bar system 13 is in turn connected to the transmission side HV bus bar system 14 via grid transformers 15 delivering the HV system voltage of the electrical grid, typically 400 kV. As can be seen the system further comprises an energy storage 16 such as a battery connected via a converter 17 and a transformer 18 to the on-shore HV bus bar 13. Furthermore a STATCOM 21 may be connected to the on-shore HV busbar 13, e.g. via a separate transformer 22, as illustrated in FIG. 1. A dump load 20 may also be provided.

As to the STATCOM it should be noted, that a large variety of power electronic devices and sub-systems are used in power systems for providing various functions such as voltage control, reactive power control and frequency control. Such devices and sub-systems are often referred to as STATCOM's (Static Synchronous Compensator), SVC's (Static Var Compensator), FACTS (Flexible AC Transmission Systems) etc. In order to simplify the description STATCOM is used throughout this description while it shall be understood that the description also applies for any other such device or sub-system.

It should be noted that the design described in FIG. 1 is one embodiment, and the skilled person will understand that there are multiple other possible designs. In particular it should be clear that the transformer 18 may be combined with the grid transformer 15 connecting the converter 17 to a tertiary winding on the grid transformer 15. This is a method of connecting STATCOMs 21 often seen. Likewise, it should be clear that the transformer 18 could be connected at other locations such as to the HV bus bar system 14, but in principle also at the offshore bus bar system 11 or the offshore MV bus bar 9, although that may be less interesting due to the costs associated with placing large components offshore.

According to an additional aspect of the present invention is suggested to implement suitable control of the converter 17 to substitute the electrical grid 2 in the event of a loss thereof. That is to say, in the event of a loss of the grid 2 the connection thereto is immediately interrupted, e.g. between the grid transformers 15 and the on-shore HV bus bar system 13. The island mode thus established may then be kept stable by the energy storage 16 and converter 17 for a substantially longer time than the ride-through capacity of the individual wind turbine generators 3, 4 thereby making it possible for the wind farm 1 to go directly into island mode ready to provide black-start service to the grid 2 or ready to synchronize with and reconnect to the grid when the grid has been reenergized. One or more dump loads 20 may be used at different locations in the islanded system to help stabilize it, i.e. keeping frequency and voltage stable. One such location would be in the on-shore substation in connection with or associated with the energy storage 16 and converter 17. Please note that FIG. 1 is purely schematic in this respect, and the blocks representing the energy storage 16, the converter 17, dump load 20, and STATCOM 21 could and would in practice be coupled differently as already indicated above. Typically, a dump load 20 comprises an air-cooled resistor bank where the dissipated power is controlled e.g. by electronically chopping the electrical supply.

If, however, the ride through fails, the wind farm 1 will still be able to implement the method according to the first and second aspect of the invention and provide black-start service according to the new and inventive approach according to which groups of wind turbine generators 3, 4 may started simultaneously using the common energy storage 16, rather than in sequence starting with a single wind turbine generator 3, 4, which has itself first to be stabilized in island mode before it can be used to start other wind turbine generators 3, 4.

In that case, the various parts of infrastructure of the wind farm 1, including transformers 10, HV bus bar system 11, MV bus bar system 9, array cable lines 5, 6 etc. as well as the export cable 12 are isolated from each other by means of conventional switchgear.

Utilizing now the large energy storage capacity of the energy storage 16, it is possible to energize the infrastructure of islanded wind farm 1 in a novel step by step process according to the invention.

So the converter will first energize the transformer 18 and the bus bar system 13. In this respect it should be noted that the amount of energy needed to energize transformers of the size and capacities of a system as the one described here are far from negligible. Likewise is the energy needed to energize the AC export cable 2 which may have a substantial length and even in some cases exceeding 100 km to an offshore wind farm 1.

Further energy is then needed to energize at least one of the transformers 10 between the HV bus bar system 11 and the MV bus bar system 9, and finally at least one of the array cable lines 5, 6 with the transformers 7, 8 and/or converters associated with the individual wind turbine generators 3, 4 of the group connected to a respective array cable line 5, 6.

Once energized this energized system may be kept stable by the energy storage 16 and converter 17, be it with the assistance of the STATCOM 21 for stabilizing the voltage or balancing the reactive power of the islanded system, or possibly without it, and the entire group of wind turbine generators 3, 4 or parts thereof may be reconnected to the islanded system. Depending on the storage capacity of the energy storage 16, more array cable lines 5, 6 and more transformers 10 could be energized simultaneously. In any case energizing and connecting just one group of wind turbine generators 3, 4 simultaneously on a single array cable line 5, 6 is substantially faster than the traditional approach of starting first a single wind turbine generator 3, 4 and only then increasing the power of the islanded system by adding more wind turbine generators to the island infrastructure of the wind farm.

Maintaining a stable island mode of a wind farm 1 is quite a complex task involving control of the power delivered by the wind turbine generators 3, 4, e.g. keeping the wind turbine generators 3, 4 below full production and possibly dissipating excess energy production in one or more dump loads 20, in order to keep frequency and voltage stable.

Once a stable island mode of the wind farm 1 or at least a sufficiently larger part thereof has been achieved using the new inventive method the wind farm 1 may be reconnected to the powerless electrical grid 2. The reconnection need not be immediate. Rather, with the energy storage 16 and converter 17, dump loads 20, STATCOM 21, etc., the islanded system may be controlled and kept stable for a desired duration, or in principle any length of time. It should be noted that in the event where a black-start is needed after a total blackout the electrical grid 2 will normally have been divided into smaller sections, so that only the section adjacent the wind farm 1 providing the black-start is energized in by the wind farm 1. Only subsequently will other parts of the electrical grid 2 be energized to e.g. start other wind farms not having black-start capabilities and eventually reach normal operation with energy to all consumers.

However, if other corresponding or identical wind farms with black-start capability exist and are located at other parts of the electrical grid 2 it may be possible to provide signals between them on suitable channels 19 so as to already synchronize the black-start wind farms with each other while in island mode in turn leading to a faster re-synchronisation and reconnection of the various parts of the electrical grid 2, when re-establishing the grid 2 after a blackout. The same would be possible with solar farms with black-start capabilities.

When reconnecting the electrical grid 2 using the transformers 15 the converter may remain active for inter alia increased stability. In terms of stability is should be noted that the converter may have an associated or integrated STATCOM 21 allowing the production or absorption of reactive power. This as such will however not complicate the equipment needed and the involved costs in any prohibitive manner, as normally STATCOMs 21 with a corresponding power rating would already need to be implemented in the on-shore substation in order to comply with the grid code requirements regarding production and absorption of reactive power.

Furthermore, the control systems of the converter and the control systems of other controllable components such as transformers with tap-changers, switchable reactors, reactors with tap-changers and STATCOMs 21 may be used individually or in coordination to facilitate energization of the wind farm for example by energizing at lower than normal voltage and subsequently ramping up the voltage thereby limiting transient events during energization. Wind farm control systems, wind turbine control systems, and once reconnected also wind turbines, may be included in controlling the islanded system.

The skilled person will understand that the present invention is not limited to specific types of wind turbines or wind farm infrastructures. It is applicable in numerous cases where the overall power source comprises multiple individual power sources connected in arrays via DC/AC conversion steps and AC/AC transformations steps collecting and aggregating the generated power a s grid connection point, e.g. in a similar way as described for the wind farms above. In particular photo voltaic solar farms in for example spacious and sunny places remote from populated areas, e.g. in deserts could be envisaged as long as the farms utilize an AC export line for the connection to the electrical grid 2. However, apart from the above mentioned wind turbines and solar panels the general idea is relevant for any type or mix of types of distributed generation or storage including wave power, hydroelectric power, and thermal power, as well distributed battery storages, such as pools of batteries in electric vehicles set up with a central grid connection point.

The invention claimed is:

1. A method of black-starting a non-energized electrical grid using a wind farm operably connected to the electrical grid via an AC export cable, comprising:
   disconnecting the wind farm from the electrical grid;
   energizing a plurality of wind turbine generators of the wind farm by energizing the AC export cable from a first end using an energy storage with an associated converter, the energy storage being disposed between the wind farm and the electrical grid; and
   supplying energy from the plurality of wind turbine generators to the electrical grid by energizing the AC export cable from a second end.

2. The method of claim 1, wherein the energy in the energy storage with the associated converter was provided by the wind farm.

3. The method of claim 1, wherein the wind farm is offshore and the energy storage with the associated converter is on-shore.

4. The method of claim 1, wherein the plurality of wind turbine generators are stopped before being simultaneously energized.

5. The method of claim 1, wherein the plurality of wind turbine generators are not stopped before being simultaneously energized, wherein the energy storage with the associated converter is used to facilitate ride-through.

6. The method of claim 1, further comprising operating the plurality of wind turbine generators in island mode before supplying energy from the plurality of wind turbine generators to the electrical grid.

7. The method of claim 6, wherein one or more dump loads and control systems are provided for operating the plurality of wind turbine generators in island mode.

8. The method of claim 3, wherein the associated converter comprises a STATCOM.

9. The method of claim 1, further comprising sending synchronization information about the black-start to another wind farm.

10. A system comprising:
    an offshore wind farm comprising plurality of wind turbine generators;
    an on-shore energy storage with an associated converter; and
    an AC export cable for connecting the wind farm to a bus and connecting the energy storage with an associated converter to the bus;

wherein the bus is also connected to an electrical grid, and wherein in normal operation, said AC export cable is energized from the wind farm side to provide electricity to the electrical grid, and wherein, in the event of a power loss in the electrical grid, the system is configured to black-start the electrical grid, wherein the energy storage with an associated converter energizes the plurality of wind turbine generators by energizing the AC export cable from the on-shore side.

11. The system of claim 10, wherein the associated converter comprises a STATCOM.

12. The system of claim 10, further comprising one or more dump loads and control systems for operating the plurality of wind turbine generators in an island mode.

13. The system of claim 10, further comprising at least one channel for sending synchronization information about the black-start to another wind farm.

14. The system of claim 10, further comprising one or more buses, one or more transformers, and one or more common array cables for connecting the plurality of wind turbine generators to the AC export cable.

15. The system of claim 10, wherein the energy storage with the associated converter is adapted to perform at least one of disconnect or reconnect of the wind farm to the electrical grid.

16. The system of claim 15, wherein the energy storage with the associated converter provides power to the electrical grid after reconnecting the wind farm to the electrical grid.

17. A method for re-energizing an electrical grid after a power loss, said method comprising:

upon power loss, energizing a plurality of wind turbine generators of a wind farm by energizing an AC export cable extending between the electrical grid and the plurality of wind turbine generators from a first end using an energy storage with an associated converter;

operating the plurality of wind turbine generators in a ride-through mode; and supplying energy from the plurality of wind turbine generators to the electrical grid.

18. The method of claim 17, further comprising operating the plurality of wind turbine generators in island mode after ride-through and before supplying energy from the plurality of wind turbine generators to the electrical grid.

19. The method of claim 17, wherein an energy storage with an associated converter is used to simultaneously energize the plurality of wind turbine generators.

20. The method of claim 17, wherein island mode is facilitated by one or more dump loads and control systems for operating the plurality of wind turbine generators in island mode.

21. The method of claim 17, wherein the energy storage with the associated converter is on-shore.

* * * * *